US009651948B2

(12) United States Patent
Wilson et al.

(10) Patent No.: US 9,651,948 B2
(45) Date of Patent: May 16, 2017

(54) ROLL ATTITUDE-DEPENDENT ROLL RATE LIMIT

(71) Applicant: The Boeing Company, Chicago, IL (US)

(72) Inventors: Douglas L. Wilson, Mercer Island, WA (US); David W. Grubb, Mukilteo, WA (US); Mark R. Morel, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 99 days.

(21) Appl. No.: 14/853,918

(22) Filed: Sep. 14, 2015

(65) Prior Publication Data

US 2017/0075350 A1    Mar. 16, 2017

(51) Int. Cl.
| | | |
|---|---|---|
| G05D 1/00 | (2006.01) |
| G05D 1/06 | (2006.01) |
| G05D 3/00 | (2006.01) |
| G06F 7/00 | (2006.01) |
| G06F 17/00 | (2006.01) |
| G05D 1/08 | (2006.01) |
| B64C 9/00 | (2006.01) |

(52) U.S. Cl.
CPC ............ *G05D 1/0083* (2013.01); *B64C 9/00* (2013.01); *G05D 1/0816* (2013.01); *B64C 2009/005* (2013.01)

(58) Field of Classification Search
CPC ...... G05D 1/0083; G05D 1/0816; B64C 9/00; B64C 2009/005

USPC ............................................................. 701/5
See application file for complete search history.

(56) References Cited

U.S. PATENT DOCUMENTS

| | | | | |
|---|---|---|---|---|
| 3,467,344 A | | 9/1969 | Kramer et al. | |
| 3,848,833 A | * | 11/1974 | Rauschelbach | G05D 1/0061 244/177 |
| 4,924,401 A | * | 5/1990 | Bice | G09B 9/006 244/181 |
| 5,553,817 A | * | 9/1996 | Gold | G05D 1/0858 244/17.13 |
| 7,110,870 B2 | * | 9/2006 | Tseng | B60G 17/0162 280/755 |
| 7,333,883 B2 | * | 2/2008 | Geborek | B60R 21/0132 280/734 |
| 7,561,951 B2 | * | 7/2009 | Rao | B60W 50/035 180/268 |
| 7,917,254 B2 | * | 3/2011 | Krogh | G05D 1/0676 244/158.1 |
| 8,423,206 B2 | * | 4/2013 | Shapiro | G05D 1/0072 701/3 |
| 8,731,810 B2 | * | 5/2014 | Conway | G08G 5/0026 701/120 |

FOREIGN PATENT DOCUMENTS

EP    2 500 792 A1    9/2012

* cited by examiner

*Primary Examiner* — Harry Oh
(74) *Attorney, Agent, or Firm* — Haynes and Boone, LLP

(57) ABSTRACT

Systems and methods are provided for a roll attitude dependent roll rate limit that may limit an aircraft to a lower roll rate limit under normal flight conditions. The systems and methods may detect situations where a higher roll rate limit may be desirable and allow the aircraft to exceed the lower roll rate limit, to either a higher roll rate limit or a roll rate between the lower and higher roll rate limit.

24 Claims, 5 Drawing Sheets

ROLL ATTITUDE-DEPENDENT ROLL RATE LIMIT

TECHNICAL FIELD

The disclosure relates generally to aircrafts and, more particularly, to roll rate control.

BACKGROUND

An aircraft may be designed for a maximum roll rate associated with a specified load factor. In general, high maximum roll rates may allow for the aircraft to recover safely from large bank angles. However, the aircraft's structure must be designed to accommodate the high maximum roll rate and this may lead to a heavy structure that may reduce the performance of the aircraft.

SUMMARY

Systems and methods are disclosed herein providing roll rate control within aircrafts. In certain examples, a system may be provided. The system may include at least one bank angle sensor configured to output bank angle data, at least one roll rate sensor configured to output roll rate data, and a controller communicatively connected to the at least one bank angle sensor and the at least one roll rate sensor. The controller may be configured to determine a vehicle dynamic characteristic with, at least, the bank angle data, determine a current roll rate of the vehicle from the roll rate data, determine if the vehicle dynamic characteristic is within a first dynamic range and then limit allowable roll rate to a first roll rate limit, determine if the vehicle dynamic characteristic is within a second dynamic range and then limit allowable roll rate to a second roll rate limit, and determine if the vehicle dynamic characteristic is within a transition dynamic range between the first dynamic range and the second dynamic range, determine a calculated roll rate limit, and then limit allowable roll rate to the calculated roll rate limit. In certain additional examples, an aircraft may be provided. The aircraft may include the system, a fuselage, and a wing with a moveable control surface and/or an engine.

In another example, a method may be provided. The method may include determining a vehicle dynamic characteristic, determining that the vehicle dynamic characteristic is outside of a first dynamic range associated with a first roll rate limit, and limiting allowable roll rate to a rate different from the first roll rate limit. In certain additional examples, an aircraft configured to perform the method may be provided. In another example, computer readable medium with code configured to perform the method may also be provided.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Aircraft structures may be designed according to a maximum roll rate in association with a specified load factor (i.e., the aircraft acceleration in "g's" due to lift on the wings). In general, high maximum roll rates may allow for higher performance from the aircraft and the ability to recover safely from large bank angles. However to safely allow for repeated high maximum roll rates under normal conditions, the aircraft's structure must be designed to accommodate the high maximum roll rate and such accommodation may require a heavier structure. Thus, typically, heavier structures may reduce the performance of the aircraft (such as the maximum allowable payload of the aircraft) and/or increase the cost of the aircraft.

The techniques and systems described herein may limit an aircraft to a lower roll rate limit under normal flight conditions. However, when conditions are detected where a higher roll rate limit may be desirable, the aircraft may be allowed to exceed the lower roll rate limit. Thus, the structure of the aircraft may be appropriately designed for the lower roll rate limit, but during emergency situations the aircraft may safely exceed the lower roll rate limit to maintain control to allow for safe operations of the aircraft. Since such situations are rare, the aircraft may be designed to occasionally safely exceed the lower roll rate limit without a significant effect on the structural life of the aircraft. In certain implementations, the aircraft may determine instances where the lower roll rate limit has been exceeded, log such occurrences, and notify operators or maintenance crews of such instances in order for greater maintenance attention to be paid to the aircraft upon the aircraft exceeding the lower roll rate limit.

Figure 1:
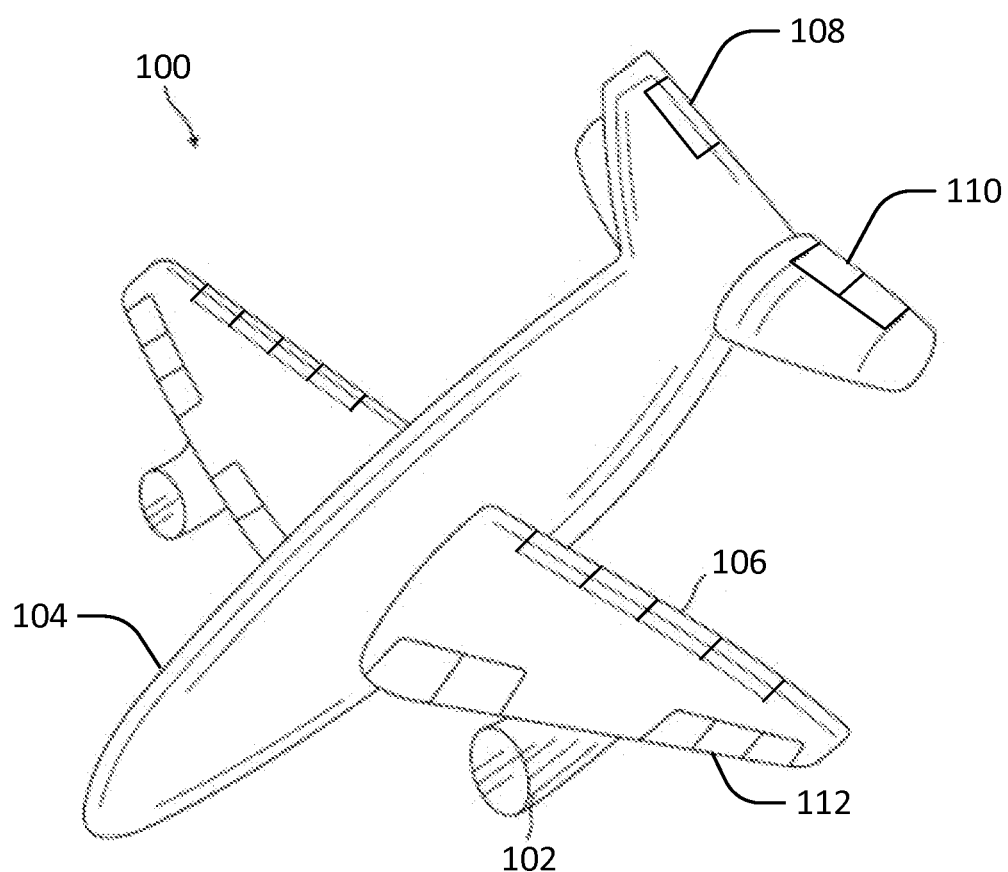
FIG. 1 illustrates an example aircraft in accordance with the disclosure.

FIG. 1 illustrates an example aircraft in accordance with the disclosure. In FIG. 1, an aircraft 100 may include an engine 102, a fuselage 104, aft wing aerodynamic devices 106, a rudder 108, elevators 110, and forward wing aerodynamic devices 112.

The engine 102 may provide thrust for the aircraft 100. The engine 102 may be any type of aircraft engine. In certain examples, the engine 102 may also provide thrust vectoring that may contribute to control of the aircraft 100.

The fuselage 104 may form the central structure of the aircraft 100. The forces from banking and other dynamic movements may be borne by, at least, the fuselage 104. The dynamic movements of the aircraft 100 may be controlled by a combination of the forward wing aerodynamic devices 112, the aft wing aerodynamic devices 106, the elevators 110, and the rudder 108.

The forward wing aerodynamic devices 112, the aft wing aerodynamic devices 106, the rudder 108, and/or the elevators 110 may be moveable control surfaces and may include a combination of one or more slats, flaps, ailerons, flaperons, spoilers, and/or rudders. One or more of the forward wing aerodynamic devices 112, the aft wing aerodynamic devices 106, the elevators 110, and/or the rudder 108 may help control the banking attitude of the aircraft 100.

Figure 2:
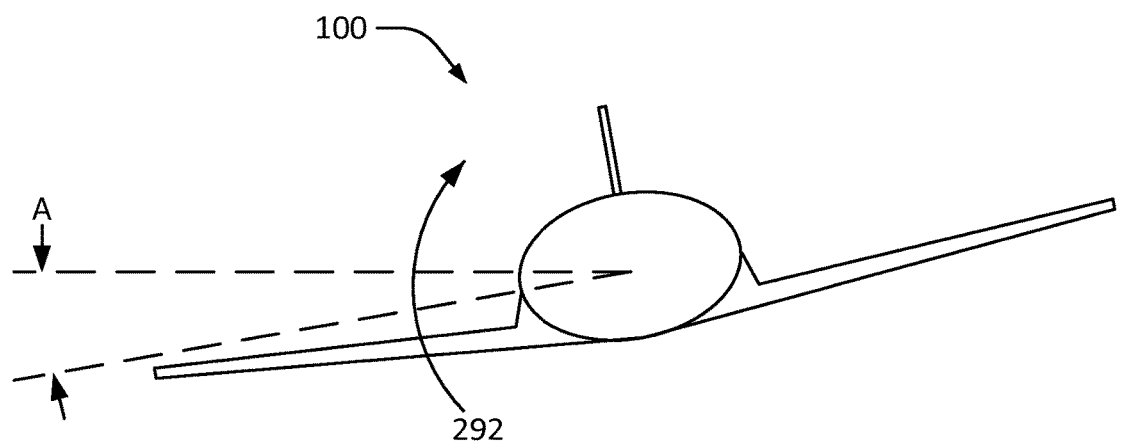
FIG. 2 illustrates an example aircraft in roll in accordance with the disclosure.

FIG. 2 illustrates an example aircraft in roll in accordance with the disclosure. FIG. 2 shows the aircraft 100 of FIG. 1 in roll. The aircraft 100 is in a roll with a bank angle corresponding to bank angle A. The bank angle A is the degree that the aircraft is deviating from horizontal.

In FIG. 2, the aircraft may be trying to reduce the bank angle, and thus return to horizontal, through roll rate 292. The roll rate 292 may be caused by a moment, acting on the aircraft 100. The roll rate 292 may possibly be induced by one or more slats, flaps, ailerons, flaperons, spoilers, and/or rudders mounted on the aircraft 100. The roll rate 292 may contribute to the roll of the aircraft 100. Greater roll rates may help safely return the aircraft 100 to horizontal at a faster rate.

Greater roll rates may also be needed in certain situations to control the aircraft 100. As an illustrative example, the aircraft 100 may initially be subjected to an initial roll moment away from horizontal. That initial roll moment may rotate the aircraft 100 away from horizontal to the bank angle A. However, in the instance of FIG. 2, the aircraft 100 may still be rotating away from horizontal due to the initial roll moment. The roll rate 292 may be created from a second moment and may need to be relatively significant to counteract the rotation of the aircraft 100 away from horizontal due to the initial roll rate. However, in certain situations, if the initial roll moment is great enough, the aircraft 100 may still be rotating quickly away from horizontal. In such a situation, the second moment may need to be large to prevent the aircraft 100 from losing control due to rolling far from horizontal. Such large roll moments, however, may impart large stresses on the airframe of the aircraft 100, such as the fuselage 104 as well as the wings and other control surfaces. Typically then, aircrafts may either require larger and heavier airframes to handle the stresses from large roll moments or roll rates, or may need to limit the maximum roll moment or roll rate of the aircraft to a lower amount, which may decrease the performance margin of the aircraft from recovering from out of control situations.

Figure 3:
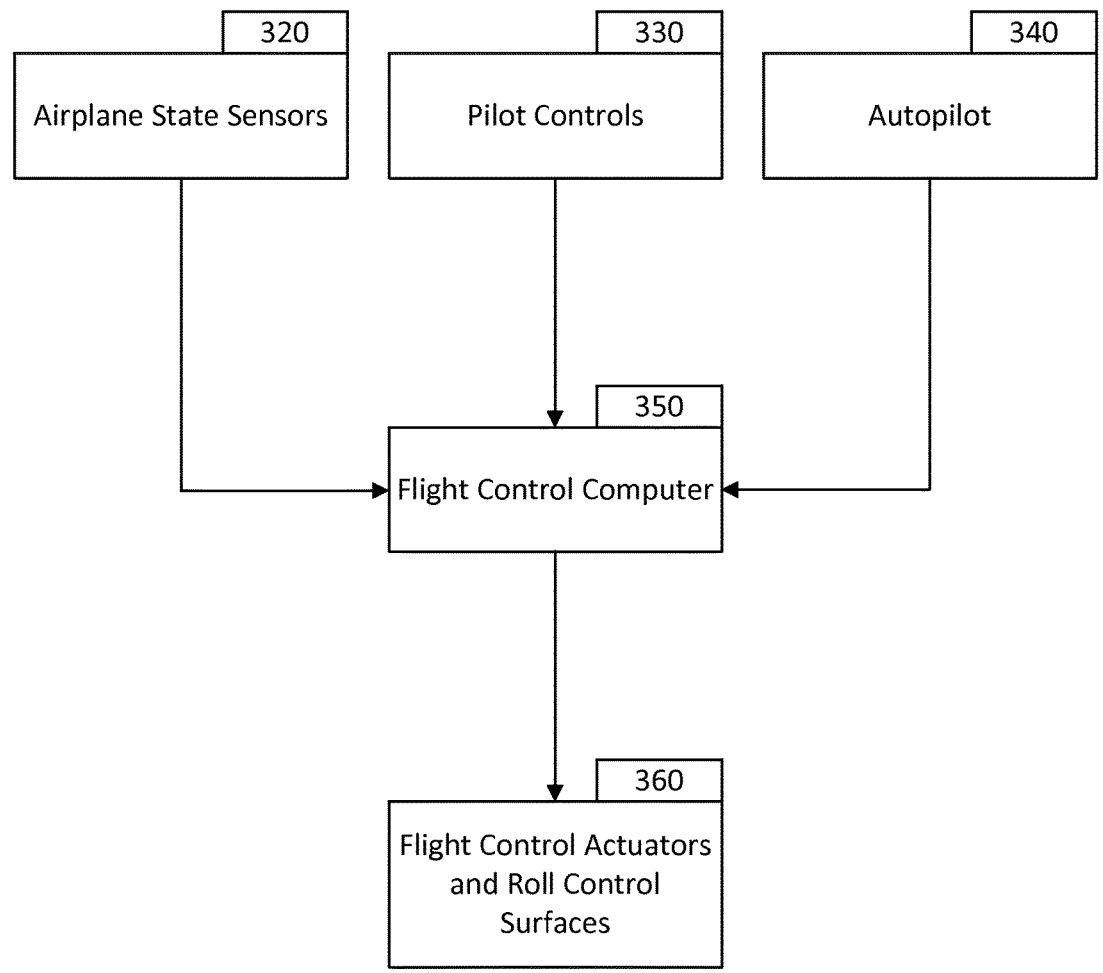
FIG. 3 illustrates an example aircraft control system in accordance with the disclosure.

FIG. 3 illustrates an example aircraft control system in accordance with the disclosure. FIG. 3 includes airplane state sensors 320, pilot controls 330, autopilot 340, flight control computer 350, flight control actuators and roll control surfaces 360.

The flight control computer 350 may receive input from the airplane state sensors 320, the pilot controls 330, and the autopilot 340. The airplane state sensors 320 may detect dynamic conditions of an aircraft. The autopilot 340 may allow for computer controlled guidance of the aircraft according to pre-inputted route instructions. The pilot controls 330 may receive inputs from a pilot or co-pilot on how to manipulate the flight control actuators and roll control surfaces 360. The pilot controls 330 may, in certain examples, be fly by wire controls where the pilot controls 330 may include only electrical connections to the flight control actuators and roll control surfaces 360.

In such examples, input from the airplane state sensors 320, the pilot controls 330, and/or the autopilot 340 may be received and interpreted by the flight control computer 350. The flight control computer 350 may then calculate suitable instructions for the flight control actuators and roll control surfaces 360 according to the input received and provide instructions to the flight control actuators and roll control surfaces 360.

Figure 4:
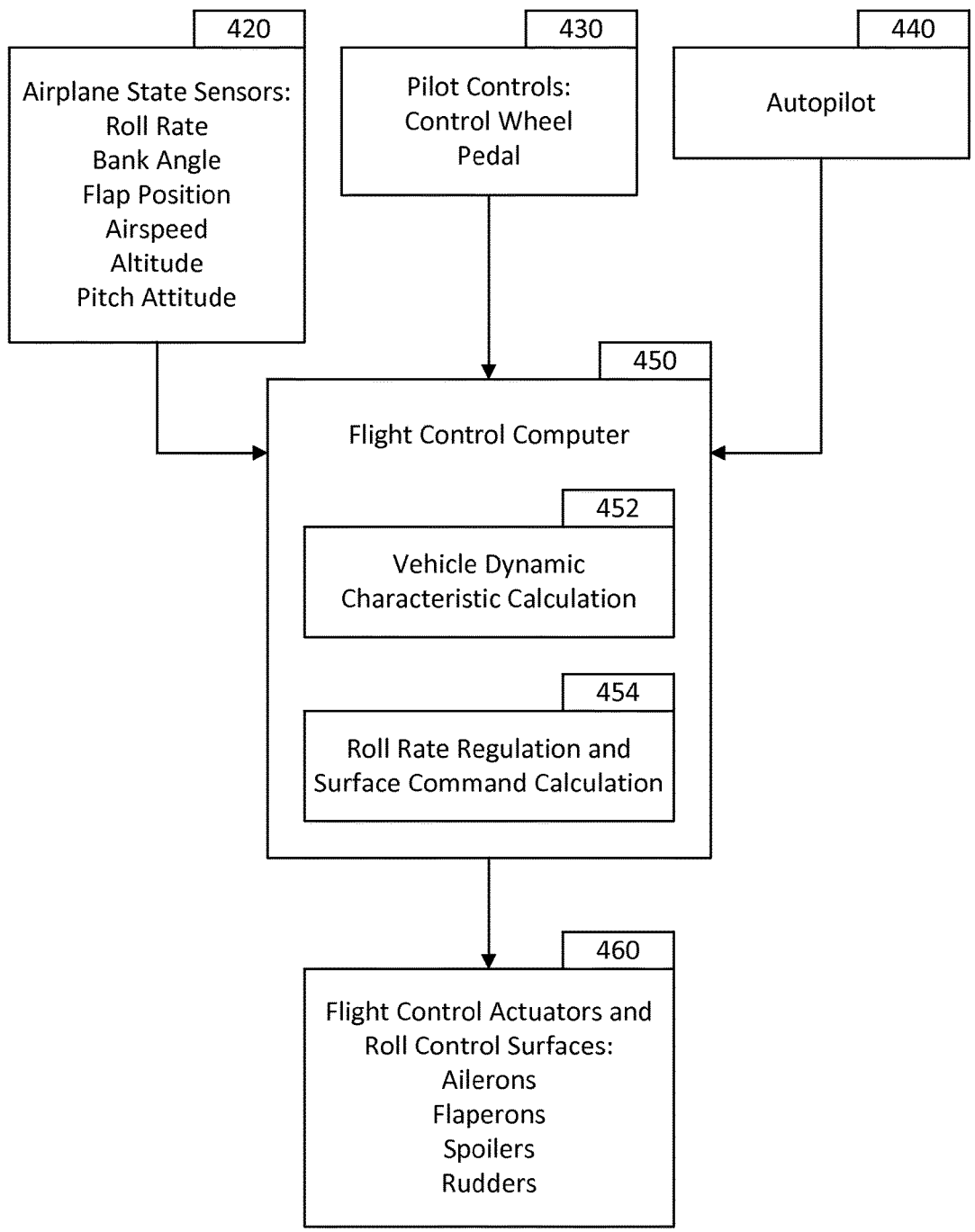
FIG. 4 illustrates a further example aircraft control system in accordance with the disclosure.

The aircraft control system of FIG. 3 may be further illustrated in FIG. 4. FIG. 4 illustrates a further example aircraft control system in accordance with the disclosure. FIG. 4 includes the airplane state sensors 420, the pilot controls 430, the autopilot 440, the flight control computer 450, and the flight control actuators and roll control surfaces 460.

The airplane state sensors 420 may include one or more roll rate sensors, bank angle sensors, flap position sensors, airspeed sensors, altitude sensors, and/or pitch attitude sensors. The roll rate sensors may detect a roll rate of the aircraft. The bank angle sensors may detect a bank angle of the aircraft. The flap position sensors may detect whether a flap or multiple flaps on the aircraft are in an up position, a down position, or another possible position. The airspeed sensors may detect an airspeed or velocity of the aircraft. The altitude sensors may detect a relative or absolute altitude of the aircraft. Absolute altitude may be an altitude of the aircraft as compared to sea level. Relative altitude may be an altitude of the aircraft relative to terrain features underneath or around the aircraft. As such, for example, the relative altitude of the aircraft may be lower than the absolute altitude if the aircraft is over hills or mountains. The relative altitude may be determined with other data, such as topographical data. The pitch attitude sensors may determine a pitch attitude of the aircraft. Thus, the pitch attitude sensors may determine if, for example, the aircraft is in a nose up, nose down, or neutral pitch attitude.

The pilot controls 430 may include one or more control wheels, pedals, joysticks, levers and other hand controls, switches, buttons, and/or other controls. In certain examples, the pilot controls may be electrically connected to the flight control computer 450. Pilot inputs received by the pilot controls 430 may be relayed to the flight control computer 450. The flight control computer 450 may then determine, using the pilot inputs as well as other inputs from other parts of the aircraft such as the airplane sensors 420, an appropriate control response to provide to the flight control actuators and roll control surfaces 460.

Similar to the autopilot 340 in FIG. 3, the autopilot 440 may allow for computer controlled guidance of the aircraft according to pre-inputted route instructions. The autopilot 440 may interface with the flight control computer 450. The flight control computer 450 may issue instructions according to instructions or settings of the autopilot 440.

The flight control computer 450 may include, for example, a single-core or multi-core processor or microprocessor, a microcontroller, a logic device, a signal processing device, memory for storing executable instructions (e.g., software, firmware, or other instructions), and/or any elements to perform any of the various operations described herein. In various examples, the flight control computer 450 and/or its associated operations may be implemented as a single device or multiple devices (e.g., communicatively linked through wired or wireless connections) to collectively constitute the flight control computer 450.

The flight control computer 450 may include one or more memory components or devices to store data and information. The memory may include volatile and non-volatile memory. Examples of such memories include RAM (Random Access Memory), ROM (Read-Only Memory), EEPROM (Electrically-Erasable Read-Only Memory), flash memory, or other types of memory. In certain examples, the flight control computer 450 may be adapted to execute instructions stored within the memory to perform various methods and processes described herein.

The flight control computer 450 may also include, in certain examples, an input device (e.g., buttons, knobs, sliders, touch screens, touch pads or other input devices) adapted to interface with a user and receive user input. In certain examples, the flight control computer 450 may include a graphical user interface (GUI), which may be integrated as part of a display or other input device. In certain such examples, the input device and the GUI may be contained within one device.

The flight control computer 450 may be connected to the airplane sensors 420, the pilot controls 430, the autopilot 440, and the flight control actuators and roll control surfaces 460. The flight control actuators and roll control surfaces 460 may include actuators, motors, and surfaces that control flight characteristics of the aircraft. For example, one or more of the ailerons, flaperons, spoilers, rudders, and other control surfaces of the aircraft may be controlled by actuators and motors.

In certain examples, the airplane sensors 420, the pilot controls 430, and the autopilot 440 may output electronic data or instructions to the flight control computer 450. In such an example, the pilot controls may receive a mechanical input from the pilot, such as a turning of the control wheel or a press of the pedal, but may then convert the mechanical input into an electrical signal that contains data relating to, for example, the degree of movement of the control wheel, the speed of movement of the input, or the distance of displacement of the pedal.

In certain examples, the flight control computer 450 may perform vehicle dynamic characteristic calculation 452. The vehicle dynamic characteristic calculation 452 may be performed using input from the airplane sensors 420. As illustrative examples, the vehicle dynamic characteristic calculation 452 may include determining dynamic characteristics of the aircraft such as the bank angle, the roll rate, and the pitch attitude of the aircraft through data from the respective sensors. The flight control computer 450 may also determine other dynamic characteristics through the airplane sensors 420 or other sensors mounted on the aircraft or received from other sources.

Additionally, the flight control computer 450 may determine, from at least the inputs from the pilot controls 430, a desired changed in aircraft dynamics. The flight control computer 450 may, for example, interpret pilot commands and translate the pilot commands to dynamic reactions from the aircraft. Thus, the flight control computer 450 may output instructions to the flight control actuators and roll control surfaces 460 based on inputs received from the pilot controls 430. Such a system may be a fly-by-wire system.

The flight control computer 450 may also perform roll rate regulation and surface command calculation 454. Roll rate regulation calculations may include, for example, calculating a maximum roll rate limit for the aircraft. The surface command calculations may be determined, at least, with input from the pilot controls 430 compared with the calculated maximum roll rate, as well as, possibly, data from the airplane sensors 420. The surface command calculation may then determine an appropriate control response that may be outputted to the control actuators and surfaces of the aircraft. The surface command calculation may include, for example, determining instructions to provide to the flight control actuators and roll control surfaces 450 to achieve the desired change in aircraft dynamics. An example of determining appropriate instructions to provide to the flight control actuators and roll control surfaces 450 may include, for example, determining how many degrees one or more roll control surfaces on the aircraft should rotate or determining appropriate movements for the rudder of the aircraft. In certain examples, the instructions provided to the flight control actuators and roll control surfaces 450 may be updated based on input from the airplanes sensors 420. Thus, if the airplane sensors 420 detect that movement of the control surfaces resulted in a greater change in aircraft flight dynamics than that calculated by the flight control computer 450, the flight control computer 450 may then issue an appropriate follow up command to the control actuators and surfaces.

Figure 5:
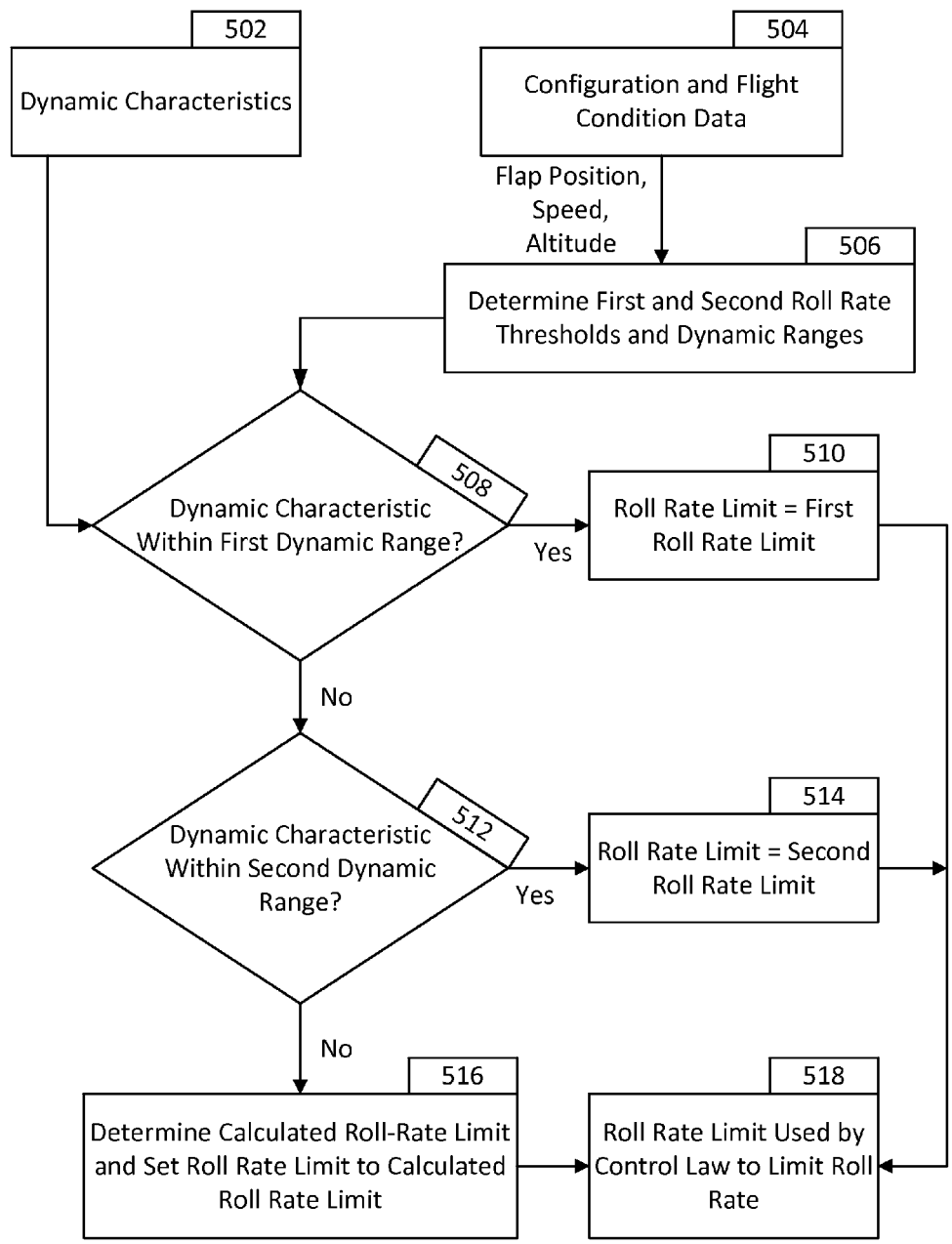
FIG. 5 illustrates a flowchart detailing an example maximum roll rate selection process in accordance with the disclosure.

An example of the roll rate regulation calculation is shown in FIG. 5. FIG. 5 illustrates a flowchart detailing an example maximum roll rate selection process in accordance with the disclosure. The process in FIG. 5 may be performed by the flight control computer using input from the airplane sensors, the pilot controls, and the autopilot. The results of the process may then be outputted or communicated to the flight control actuators and roll control surfaces.

In block 502, the dynamic characteristics of the aircraft may be determined. The dynamic characteristics may include, for example, the bank angle, the roll rate, and the pitch altitude of the aircraft. The dynamic characteristics may be determined with input from the airplane sensors.

In block 504, the configuration and flight condition data may be received from the various sensors such as various other airplane sensors. For example, the flap position sensor may provide information as to whether the flap of the aircraft is in an up position, a down position, or an intermediate position. The altitude sensor may provide information as to the relative or absolute altitude of the aircraft. The airspeed sensor may provide information as to the airspeed of the aircraft.

Using the configuration and flight condition data obtained in block 504, first and second roll rate limits and the associated dynamic ranges may be determined in block 506. The first roll rate limit may be, for example, a roll rate of 17 deg/sec while the second roll rate limit may be, for example, a roll rate of 22 deg/sec. Other examples may include other roll rate limits. Thus, as an illustrative example, such examples may include a first roll rate limit of between 5 degrees per second to 30 degrees per second and a second roll rate limit of between 10 degrees per second to 35 degrees per second. Accordingly, in certain examples, the first roll rate limit may be a lower limit appropriate for normal flight conditions while the second roll rate limit may be a higher limit appropriate for emergency or demanding flight conditions.

The first and second roll rate limits may correspond to first and second dynamic ranges. The flight control computer may determine whether the aircraft is within a first dynamic range, within a second dynamic range, or between the first and second dynamic ranges (possibly referred to as a "transition dynamic range" in certain examples). In various implementations, the first dynamic range may correspond to normal, in-flight, operating conditions of the aircraft (such as during normal cruising conditions). Such an operating condition may not require a higher maximum roll rate and so, if the flight control determines that the aircraft dynamic characteristics signifies that the aircraft is within the first dynamic range, the maximum roll rate may be limited to the first roll rate limit. The second dynamic range may correspond to situations where a higher maximum roll rate may be beneficial, such as during landing or during emergency maneuvers. Accordingly, a higher maximum roll rate, possibly corresponding to the second roll rate limit, may be allowed during such situations.

Additionally, in certain examples, there may be a dynamic range between the first dynamic range and the second dynamic range. Such a dynamic range may be referred to herein as a transition dynamic range and may correspond to situations where higher maneuverability of the aircraft and a maximum roll rate between the first roll rate limit and the second roll rate limit may be desirable. In such a situation, the maximum roll rate may be a roll rate between the first roll rate limit and the second roll rate limit, referred to herein as a calculated roll rate limit. In some such situations, the flight control computer may calculate the calculated roll rate limit. In other examples, there may be more than two dynamic ranges, such as three dynamic ranges, four dynamic ranges, or five or more dynamic ranges.

The dynamic ranges may be an indicator. The indicator may, in certain examples, be determined with data from various sensors. Accordingly, in various examples, the dynamic ranges may be determined from a combination of one or more of the roll rate, the bank angle, the flap position, the airspeed, the altitude, the pitch altitude, and other dynamic conditions, flight conditions, or configuration conditions of the aircraft.

The dynamic ranges may be determined in a variety of different ways. For example, in a certain implementation, the first dynamic range may be, for example, a bank angle of less than 55 degrees, while the second dynamic range may be, for example, a bank angle greater than 75 degrees, and the transition dynamic range may correspond to bank angles between 55 and 75 degrees. In other implementations that determine the first and second dynamic ranges with, at least, the bank angle, the bank angles that correspond to the first dynamic range may be various angles. For example, an upper limit of the first dynamic range may be a bank angle of less than 40 degrees, 45 degrees, 50 degrees, 60 degrees, 65 degrees or above, or any angle in between 40 to 65 degrees. The lower limit of the first dynamic range may, for example, a bank angle of 0 degrees. The lower limit of the second dynamic range may be, for example, a bank angle of less than 55 degrees, 60 degrees, 65 degrees, 70 degrees, 80 degrees, 85 degrees or above, or any angle in between 55 to 85 degrees. The range of the transition dynamic range may correspond to bank angles between the thresholds defining the upper limit of the first dynamic range and the lower limit of the second dynamic range.

Airspeed and altitude may also factor into the dynamic range. Landing is a situation where additional control over the aircraft may be beneficial as the pilot may have a limited window to correct aircraft behavior and thus, maximum maneuverability of the aircraft may be desirable. Accordingly, if a flight control computer detects that an aircraft is landing, or has sensor readings that are typically correlated with landing, the flight control computer may determine that the aircraft is operating in the second dynamic range.

As such, the flight control computer may determine the airspeed of the aircraft with a speed sensor. If the airspeed of the aircraft is below a speed threshold, the flight control computer may determine that the aircraft is landing or descending and operating within the second dynamic range. If the airspeed of the aircraft is above the speed threshold, the flight control computer may, according to the airspeed as well as other factors, determine if the aircraft is operating within the first, within the second, or between the first and second dynamic ranges.

The flight control computer may also detect an altitude of the aircraft and, if the altitude of the aircraft indicates that the aircraft is landing (such as a situation where the altitude of the aircraft is below a threshold, such as 5,000 feet of relative altitude, and/or the altitude of the aircraft is decreasing at a certain rate), the flight control computer may determine that the aircraft is within the second dynamic range. If the altitude of the aircraft does not indicate that the aircraft is landing, the flight control computer may, according to the altitude as well as other factors, determine if the aircraft is operating within the first, second, or between the first and second dynamic ranges.

The dynamic ranges may be determined with more than just numerical factors such as angles or velocities. The flap position may also contribute to determining which dynamic range the aircraft is operating within. Thus, if a flap or multiple flaps of the aircraft are in a down position, it may signify that the aircraft is landing. As such, if the flap or multiple flaps of the aircraft is determined to be in the down position, the flight control computer may determine that the aircraft is operating within the second dynamic range. Otherwise, the flight control computer may determine whether the aircraft is operating with the first, second, or between the first and second dynamic ranges with other factors. Certain other implementations may include multiple flap positions. The flight control computers of such implementations may determine that the aircraft is operating within the second dynamic range if the flap or flaps of the aircraft are within certain flap positions. Such flap positions may be positions indicative of an aircraft landing.

Additionally, the dynamic ranges may be determined with data from other sensors. For example, pitch attitude sensor data and roll rate data may also be used to determine whether the aircraft is operating within the first and second dynamic ranges or between the first and second dynamic range. In such implementations, if the flight control computer receives pitch attitude data showing that the aircraft is pitched up or pitched down more than normal, the flight control computer may determine that the aircraft is operating outside of the first dynamic range (and thus either between the first dynamic range and the second dynamic range or within the second dynamic range). Also, if the flight control computer receives data showing that the aircraft is rolling at a quick rate, the flight control computer may determine that the aircraft is operating outside of the first dynamic range.

In certain examples, the flight control computer may vary the first and/or second dynamic ranges and/or the first and/or second roll rate limits depending on conditions detected by the airplanes sensors. Accordingly, the flight control computer may, for example, increase or decrease the threshold value of the first dynamic range if it detects that the aircraft is accelerating or decelerating. Such increases or decreases to the dynamic ranges may be based on, for example, the forces that the aircraft structure is experiencing.

In block 508, the flight control computer may receive input from various systems of the aircraft and determine if data indicates whether dynamic characteristics of the aircraft signifies that the aircraft is operating within a first dynamic range. Whether the aircraft is operating within the first dynamic range may be determined from the various characteristics detected by the aircraft sensors described herein. Thus, for example, if the flight control computer detects a bank angle of 55 degrees or less, it may determine that the aircraft is operating in the first dynamic range. If the flight control computer determines that the aircraft is operating within the first dynamic range, the flight control computer may then set the roll rate limit to the first roll rate limit in block 510.

If the flight control computer determines that the aircraft is operating outside of the first dynamic range, the flight control computer may then proceed to block 512. In block 512, the flight control computer may determine if the aircraft is operating within the second dynamic range. As an example, if the flight control computer detects a bank angle of 75 degrees or above, it may determine that the aircraft is operating within the second dynamic range. If the flight control computer determines that the aircraft is operating within the second dynamic range, the flight control computer may then set the roll rate limit to the second roll rate limit in block 514.

If the flight control computer determines that the aircraft is operating between the first and second dynamic ranges, e.g., within the transition, dynamic range, the flight control computer may then proceed to block 516. In block 516, the flight control computer may determine a calculated roll rate limit and set the roll rate limit to the calculated roll rate limit. The calculated roll rate limit may, for example, be a limit in between the values of the first roll rate limit and the second roll rate limit. In certain examples, the calculated roll rate limit may linearly scale between the first roll rate limit and the second roll rate limit. In such examples, the dynamic range may be determined through an indicator and the calculated roll rate limit may, for example, scale according to the indicator value. Accordingly, using the previous example, if the bank angle of the aircraft is determined to be 65 degrees, the calculated roll rate limit may be a threshold directly in between the first roll rate limit and the second roll rate limit.

Once the roll rate limit has been determined in either blocks 510, 514, or 516, the roll rate limit may be used by the flight control computer as a control law to limit the roll rate of the aircraft. As such, the flight control computer may typically only set the maximum roll to the first roll rate limit, but when it detects situations where a higher roll rate limit may be desirable, it may set the maximum roll rate to the second roll rate limit or a value between the first roll rate limit and the second roll rate limit, such as a calculated roll rate limit.

The aircraft may limit the roll rate by, for example, limiting the movement of flight control actuators and/or roll control surfaces of the aircraft. Thus, the aircraft may, in one example, limit movement of one or more ailerons, flaperons, spoilers, and/or rudders of the aircraft to an amount less than the maximum allowable movement of the respective components. In another example, the aircraft may allow maximum movement of various components until the aircraft has passed a threshold roll rate, bank angle, or other dynamic threshold. After the aircraft has passed the threshold, the aircraft may then limit the movement of the flight control actuators and/or roll control surfaces to prevent the aircraft from exceeding the maximum roll rate. In certain such examples, the aircraft may begin limiting movement of the flight control actuators and/or roll control surfaces before the roll rate limit to allow the aircraft to smoothly reach, but not exceed, the roll rate limit and thus impart less stress on the aircraft structure. Other examples may use a combination of limiting the movement of the various flight control actuators and/or roll control surfaces of the aircraft as well as thresholds to further limit the movement of such devices.

Examples described above illustrate but do not limit the invention. It should also be understood that numerous modifications and variations are possible in accordance with the principles of the present invention. Accordingly, the scope of the invention is defined only by the following claims.

What is claimed is:

1. A system comprising:
   at least one bank angle sensor configured to output bank angle data; and
   a controller configured to:
      determine a vehicle dynamic characteristic with, at least, the bank angle data;
      determine if the vehicle dynamic characteristic is within a first dynamic range and, when it is determined that the vehicle dynamic characteristic is within the first dynamic range, limit an allowable roll rate to a first roll rate threshold;
      determine if the vehicle dynamic characteristic is within a second dynamic range and, when it is determined that the vehicle dynamic characteristic is within the second dynamic range, limit the allowable roll rate to a second roll rate threshold; and
      determine if the vehicle dynamic characteristic is outside of the first dynamic range and the second dynamic range and, when it is determined that the vehicle dynamic characteristic is outside of the first dynamic range and the second dynamic range, determine a calculated roll rate threshold and limit the allowable roll rate to the calculated roll rate threshold.

2. The system of claim 1, wherein the calculated roll rate threshold has a value between the first roll rate threshold and the second roll rate threshold.

3. The system of claim 1, further comprising at least one speed sensor configured to output speed data, wherein the controller is further configured to determine the vehicle dynamic characteristic with the speed data.

4. The system of claim 3, wherein the controller is configured to determine that the vehicle dynamic characteristic is within the second dynamic range when the speed data indicates that a vehicle speed is below a vehicle speed threshold.

5. The system of claim 1, further comprising at least one pitch attitude sensor configured to output pitch attitude data, wherein the controller is further configured to determine the vehicle dynamic characteristic with the pitch attitude data.

6. The system of claim 1, further comprising at least one altitude sensor configured to output altitude data, wherein the controller is configured to determine that the vehicle dynamic characteristic is within the second dynamic range when the altitude data indicates that a vehicle altitude is below an altitude threshold.

7. The system of claim 1, further comprising at least one wing with a moveable control surface, wherein the controller is further configured to detect a moveable control surface configuration and determine the vehicle dynamic characteristic with the moveable control surface configuration.

8. The system of claim 1, further comprising at least one wing with a moveable control surface, wherein the controller is configured to limit the allowable roll rate by limiting a degree of travel of the moveable control surface, wherein the moveable control surface is an aileron, flaperon, spoiler, flap, slat, elevator, or rudder.

9. The system of claim 8, further comprising at least one roll rate sensor configured to output roll rate data, wherein the controller is configured to:
   determine a current roll rate from the roll rate data; and
   limit the degree of travel of the aileron responsive to the current roll rate.

10. The system of claim 1, further comprising at least one speed sensor configured to output speed data, at least one altitude sensor configured to output altitude data, and at least one wing with a moveable control surface, wherein the controller is further configured to determine the vehicle dynamic characteristic with, at least, the speed data, the altitude data, and a detected moveable control surface configuration.

11. The system of claim 1, further comprising at least one speed sensor, pitch sensor, altitude sensor, or moveable control surface configuration sensor, wherein the controller is further configured to determine at least the first roll rate threshold and/or the second roll rate threshold from data outputted by the at least one speed sensor, pitch sensor, altitude sensor, or moveable control surface configuration sensor.

12. The system of claim 1, wherein the vehicle dynamic characteristic is calculated from the bank angle data, the first dynamic range is a bank angle of 55 degrees or less, and the second dynamic range is a bank angle of 75 degrees or more.

13. The system of claim 1, wherein the first roll rate threshold is a roll rate of XX and the second roll rate threshold is a roll rate of YY.

14. An aircraft comprising:
a fuselage;
a wing with a moveable control surface and/or an engine;
at least one bank angle sensor configured to output bank angle data associated with the aircraft; and
a controller configured to:
  determine a vehicle dynamic characteristic with, at least, the bank angle data,
  determine if the vehicle dynamic characteristic is within a first dynamic range and, when it is determined that the vehicle dynamic characteristic is within the first dynamic range, limit an allowable roll rate of the aircraft to a first roll rate threshold,
  determine if the vehicle dynamic characteristic is within a second dynamic range and, when it is determined that the vehicle dynamic characteristic is within the second dynamic range, limit the allowable roll rate to a second roll rate threshold, and
  determine if the vehicle dynamic characteristic is outside of the first dynamic range and the second dynamic range and, when it is determined that the vehicle dynamic characteristic is outside of the first dynamic range and the second dynamic range, determine a calculated roll rate threshold and the limit allowable roll rate to the calculated roll rate threshold.

15. A method comprising:
determining a vehicle dynamic characteristic, wherein the vehicle dynamic characteristic is determined with, at least, bank angle data associated with a bank angle of a vehicle;
determining that the vehicle dynamic characteristic is outside of a first dynamic range associated with a first roll rate threshold; and
limiting, responsive to determining that the vehicle dynamic characteristic is outside of the first dynamic range, an allowable roll rate of the vehicle to a rate different from the first roll rate threshold.

16. The method of claim 15, further comprising:
determining that the vehicle dynamic characteristic is within a second dynamic range associated with a second roll rate threshold different from the first roll rate threshold; and
limiting, responsive to determining that the vehicle dynamic characteristic is within the second dynamic range, the allowable roll rate to the second roll rate threshold.

17. The method of claim 16, wherein the vehicle dynamic characteristic is calculated from a bank angle of a vehicle and the method further comprises:
determining that the bank angle of the vehicle is above a bank angle threshold; and
determining, responsive to determining that the bank angle of the vehicle is above the bank angle threshold, that the vehicle dynamic characteristic is within the second dynamic range.

18. The method of claim 17, wherein the bank angle threshold is a bank angle of 75 degrees or more.

19. The method of claim 16, further comprising:
determining that a speed of a vehicle is below a speed threshold; and
determining, responsive to determining that the speed of the vehicle is below the speed threshold, that the vehicle dynamic characteristic is within the second dynamic range.

20. The method of claim 16, further comprising:
determining that an altitude of a vehicle is below an altitude threshold; and
determining, responsive to determining that the altitude of the vehicle is below the altitude threshold, that the vehicle dynamic characteristic is within the second dynamic range.

21. The method of claim 15, further comprising:
determining that the vehicle dynamic characteristic is outside of the first dynamic range and a second dynamic range;
calculating a calculated roll rate threshold; and
limiting, responsive to determining that the vehicle dynamic characteristic is outside of the first dynamic range and the second dynamic range, the allowable roll rate to the calculated roll rate threshold.

22. The method of claim 15, further comprising:
detecting a roll rate of a vehicle greater than a first roll rate amount; and
inspecting, responsive to detecting the roll rate of the vehicle greater than the first roll rate amount, at least a portion of the vehicle.

23. An aircraft comprising:
a fuselage;
a wing with a moveable control surface and/or an engine;
at least one bank angle sensor configured to output bank angle data associated with the aircraft; and
a controller configured to:
  determine a vehicle dynamic characteristic, wherein the vehicle dynamic characteristic is determined with, at least, the bank angle data,
  determine that the vehicle dynamic characteristic is outside of a first dynamic range associated with a first roll rate threshold, and
  limit, responsive to determining that the vehicle dynamic characteristic is outside of the first dynamic range, an allowable roll rate of the aircraft to a rate different from the first roll rate threshold.

24. A non-transitory computer readable medium with code configured to perform a method, the method comprising:
determining a vehicle dynamic characteristic, wherein the vehicle dynamic characteristic is determined with, at least, bank angle data associated with a bank angle of a vehicle;

determining that the vehicle dynamic characteristic is outside of a first dynamic range associated with a first roll rate threshold; and limiting, responsive to determining that the vehicle dynamic characteristic is outside of the first dynamic range, an allowable roll rate of the vehicle to a rate different from the first roll rate threshold.

\* \* \* \* \*